US009174397B2

(12) United States Patent
Fernyhough

(10) Patent No.: US 9,174,397 B2
(45) Date of Patent: Nov. 3, 2015

(54) AIRCRAFT PLASTICS REPAIR

(71) Applicant: David Fernyhough, South Geelong (AU)

(72) Inventor: David Fernyhough, South Geelong (AU)

(73) Assignee: Aircraft Plastics Australia Pty. Ltd., South Geelong, Victoria (AU)

( * ) Notice: Subject to any disclaimer, the term of this patent is extended or adjusted under 35 U.S.C. 154(b) by 0 days.

(21) Appl. No.: 13/889,402

(22) Filed: May 8, 2013

(65) Prior Publication Data

US 2013/0240119 A1 Sep. 19, 2013

Related U.S. Application Data

(62) Division of application No. 12/677,734, filed as application No. PCT/AU2008/001347 on Sep. 10, 2008, now abandoned.

(30) Foreign Application Priority Data

Sep. 11, 2007 (AU) ................................ 2007904913

(51) Int. Cl.
*B29C 73/10* (2006.01)
*B64F 5/00* (2006.01)

(52) U.S. Cl.
CPC ............... *B29C 73/10* (2013.01); *B64F 5/0081* (2013.01)

(58) Field of Classification Search
CPC ...... B29C 73/10; B29C 73/105; B29C 73/12; B29C 73/14; B64F 5/0081
USPC .............. 8/137; 156/94, 325; 264/36.1, 36.22
See application file for complete search history.

(56) References Cited

U.S. PATENT DOCUMENTS

| 2,795,523 | A | * | 6/1957 | Cobb et al. | ....................... 156/94 |
| 4,526,636 | A | | 7/1985 | Mader | |
| 4,743,468 | A | * | 5/1988 | Jimenez | ........................ 427/140 |
| 2004/0131769 | A1 | * | 7/2004 | Saxon | ........................... 427/140 |
| 2007/0087198 | A1 | * | 4/2007 | Dry | .............................. 428/408 |

FOREIGN PATENT DOCUMENTS

JP 2004183261 A * 7/2004

OTHER PUBLICATIONS

JPO English machine translation of JP 2004-183261, retrieved Dec. 12, 2014.*
European Patent Office—Search Report for European Patent Application No. 08 783 067.5-1703, Issued: Jan. 7, 2015.

* cited by examiner

*Primary Examiner* — Timothy Kennedy
(74) *Attorney, Agent, or Firm* — Edwin D. Schindler

(57) ABSTRACT

A method for a repair of materials used in the manufacture of non-structural aircraft interior components includes the steps of laying fiberglass over a damaged surface and adhering the fiberglass with a fast-adhering glue, that includes at least one of cyanoacrylate and a cyanoacrylate activator for repairing the surface, to the damaged surface. A related method that includes applying a cyanoacrylate activator is used for removing pen and pencil marks for a synthetic leather material.

8 Claims, No Drawings

AIRCRAFT PLASTICS REPAIR

CROSS-REFERENCE TO PRIOR APPLICATIONS

This is a division of U.S. patent application Ser. No. 12/677,734, now abandoned, which represents the U.S. National Phase patent application of P.C.T. International Application No. PCT/AU2008/001347, filed Sep. 10, 2008.

AREA OF THE INVENTION

This invention relates to the area of plastic and other synthetic materials and to the repair of these materials. In particular the invention relates to a means for repairing the interior components of aircraft.

BACKGROUND TO THE INVENTION

It is common for the various interior fittings of aircraft to become damaged over time with use.

Most of these fittings, whether actual components such as seats, trays and the like or alternatively veneers for surfaces, are manufactured from some synthetic material or plastic approved for use in aircraft. These fittings, while not including structural airplane components, have an unpleasant visual effect if damaged even if the damage is of a minor nature such as scratching.

Unfortunately the synthetic materials can be difficult to repair in a visually aesthetic fashion however the alternative of replacing each damaged item is very costly.

For example, while it may appear desirable to repair a damaged component with fibreglass type materials because of the advantage of laying a mat layer over a crack, in this situation it is not appropriate as these surfaces act to release epoxy resins and the like.

OUTLINE OF THE INVENTION

It is the object of this invention to provide a means whereby damaged non structural components in the interior of an aircraft may be repaired to a standard that does not derogate from the appearance the components.

The invention is one aspect is a process for the repair of materials used in the manufacture of non structural aircraft interior components which includes the laying of fibreglass material over a damaged surface and adhering it to the damaged surface with a glue of the "instant glue" variety.

The invention in a second aspect is a means of removing pen and pencil marks from materials used in the manufacture of non structural aircraft interior components.

It is preferred that the instant glue variety used be a cyanoacrylate type material.

It is further preferred that the cyanoacrylate material include Loctite® both in the form of Loctite® liquid super glue and Loctite® gel.

It is also preferred that the fibreglass material used be of a mat form. It is further preferred that the mat used have an adhesive backing to provide a bond with an underlying surface.

It is further preferred that such a backing could include synthetic rubber-acrylic compound elastomeric-adhesive resin which can flexibly adhere fibreglass mat to a substrate. The precise type of fibreglass used whether with a backing or not or the type of adhesive backing used is however not restricted in the invention.

In order that the invention may be more readily understood we shall describe by way of non limiting example specific embodiments of the invention.

BRIEF DESCRIPTION OF AN EMBODIMENT OF THE INVENTION

As previously stated the invention provides a process for the repair of non structural interior components of an aircraft.

Such components, whether being veneered surfaces which are scratched or trays and the like which have breaks or cracks in them, are generally constructed or surfaced with synthetic materials which can be difficult to repair.

Many glues available do not adhere well to plastics and synthetics. From the point of providing a well distributed join and smooth repair it may seem advantageous to cover a break or the like with fibreglass mat of some variety however these materials are commonly bonded using epoxy resins which do not adhere well to synthetics.

Given that glues of the "instant glue" or "super glue" type can be used to bond to a wide variety of substrates it would be desirable to use these products however they are not alone suitable for the repair of deep cracks, breaks or extensively damaged surfaces.

The invention involves the use of a combination of these materials. For example fibreglass mat which is penetrable by a glue can be used to cover a damaged surface. Glue such as Loctite® which can be delivered as a liquid from a tube can be squeezed onto the fibreglass mat where it will pass through and bond to an underlying surface.

In the invention the preferred type of fibreglass material to be used is a fibreglass mesh having an adhesive backing, which can adhere well to a plastic or other such surface, which is of the type often used to cover discontinuities in materials such as plasterboard.

For additional strength it is often also preferred that a plurality of layers of this material be used over each other. No particular alignment of the mesh is required as the glue used can pass through it to the surface.

The final lay up or repair may also be finished, prior to colouring the surface, using a Loctite® Tac Pac® product sprayed on with an atomiser or the like.

Where a particularly deep scratch is encountered it may be preferred that a Loctite® gel, or other such product, be used to fill the scratch prior to being repaired as described above.

The invention also includes a means of removing pen and pencil marks from materials used in the manufacture of non-structural aircraft interior components and in particular synthetic leather type materials.

This can be effected using a compound such as Loctite 7452™ which is a cyanoacrylate activator consisting of acetone and amine which is customarily used to ensure rapid fixturing however we have found it to be useful in removing the above mentioned marks.

A fine brush is stroked lightly over the marked area repeatedly until the pen mark becomes faded. The synthetic leather is then dabbed lightly with a clean cloth and allowed to dry before the process is repeated until the pen mark is unnoticeable It is important at this stage not to rub the synthetic leather with the cloth as this will cause the surface of the synthetic leather to release from its cloth backing instantly thereby causing a hole to appear.

When the synthetic leather has dried it is preferably sprayed with an approved aviation cleaner and wiped lightly over the previously marked areas to remove any halo effect which may have appeared whilst washing out the pen mark.

In some cases it may be necessary to repeat this process several times to achieve a good result, depending on the composition of the ink in the pen which caused the mark. The synthetic leather will however shrink back to its original look once the effects of the chemical have evaporated from the material. This method has been found to be most effective on removing ball point pen marks.

Clearly many repairs to the interior fittings of aircraft can be carried out using a combination of fibreglass and "instant glue" type products and surface finished to blend with the untouched parts of these fittings.

This process is not as such restricted to any particular range of commercially available products however any of these, if of the appropriate type, may be used in the repair process.

The invention described here provides a unique means for repairing synthetic surfaces and fittings in an aircraft interior and while we have described here specific embodiments of the invention it is to be understood that variations and modifications in these can be made without departing from the spirit and scope of the invention.

The claims defining the invention are as follows:

1. A process for repairing a damaged underlying surface of a non-structural aircraft interior component, within the aircraft, comprising the steps of:
    positioning at least one layer of a fibrous material over an underlying damaged surface, said fibrous material being formed as a mat; and,
    applying a non-epoxy resinous cyanoacrylate-based adhesive to said at least one layer of fibrous material so that the non-epoxy resinous cyanoacrylate-based adhesive is able to penetrate the mat of said fibrous material to contact said underlying damaged surface for adhering said fibrous material to said underlying damaged surface.

2. The process for repairing a damaged underlying surface of a non-structural aircraft interior component, within the aircraft, according to claim 1, wherein said fibrous material is fibreglass.

3. The process for repairing a damaged underlying surface of a non-structural aircraft interior component, within the aircraft, according to claim 1, wherein said mat has a non-epoxy resinous adhesive backing for providing an initial bond with the underlying damaged surface.

4. The process for repairing a damaged underlying surface of a non-structural aircraft interior component, within the aircraft, according to claim 3, wherein said adhesive backing is a non-epoxy elastomeric-adhesive resin for flexibly adhering said mat to the underlying damaged surface.

5. The process for repairing a damaged underlying surface of a non-structural aircraft interior component, within the aircraft, according to claim 1, wherein said step of applying the non-epoxy resinous cyanoacrylate-based adhesive to the at least one layer of fibrous material comprises applying the non-epoxy resinous cyanoacrylate-based adhesive in a liquid form.

6. The process for repairing a damaged underlying surface of a non-structural aircraft interior component, within the aircraft, according to claim 1, wherein said step of applying the non-epoxy resinous cyanoacrylate-based adhesive to the at least one layer of fibrous material comprises applying the non-epoxy resinous cyanoacrylate-based adhesive in a gel form.

7. The process for repairing a damaged underlying surface of a non-structural aircraft interior component, within the aircraft, according to claim 1, wherein said step of positioning the at least one layer of fibrous material comprises positioning the at least one layer of fibrous material to substantially cover the underlying damaged surface.

8. The process for repairing a damaged underlying surface of a non-structural aircraft interior component, within the aircraft, according to claim 1, further comprising the step of:
    finishing an external surface of the bonded non-epoxy resinous cyanoacrylate-based adhesive and fibrous material to said underlying damaged surface by performing at least one of sanding, painting and cleaning the external surface for blending the external surface with a surrounding surface of the non-structural aircraft interior component.

* * * * *